Figure 1:
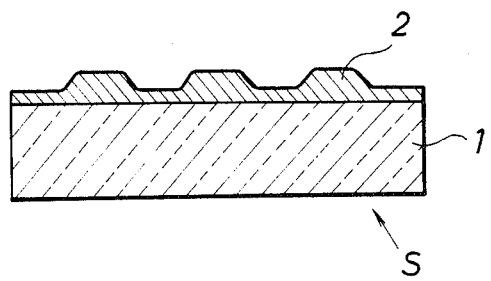

United States Patent [19]

Minami et al.

[11] Patent Number: 4,810,547
[45] Date of Patent: Mar. 7, 1989

[54] SUBSTRATE WITH FINE GROOVES AND METHOD FOR MANUFACTURING THE SAME

[75] Inventors: Tsutomu Minami, Osaka; Noboru Tohge, Nara; Shinya Katayama; Yoshihiro Matsuno, both of Osaka, all of Japan

[73] Assignee: Nippon Sheet Glass Co., Ltd., Japan

[21] Appl. No.: 30,892

[22] Filed: Mar. 26, 1987

[30] Foreign Application Priority Data

Mar. 26, 1986 [JP] Japan .................................. 61-67437
Dec. 18, 1986 [JP] Japan ................................ 61-302259
Dec. 22, 1986 [JP] Japan ................................ 61-305812

[51] Int. Cl.[4] .............................................. B32B 3/02
[52] U.S. Cl. .................................... 428/65; 264/106; 428/163; 428/469; 428/432; 428/698
[58] Field of Search ................... 264/106, 107; 428/64, 428/65, 229, 156-172, 469, 432, 698-701

[56] References Cited

U.S. PATENT DOCUMENTS

| | | | |
|---|---|---|---|
| 809,263 | 1/1906 | Hoyt et al. | 428/64 X |
| 3,256,109 | 6/1966 | Berger | 427/229 X |
| 4,304,806 | 12/1981 | Anderson et al. | 428/64 X |
| 4,332,879 | 6/1982 | Pastor et al. | 427/229 X |
| 4,532,074 | 6/1985 | Tabib et al. | 428/64 X |

Primary Examiner—Nancy A. B. Swisher
Attorney, Agent, or Firm—Scherlacher, Mok, Roth

[57] ABSTRACT

A substrate provided thereon, with a film having a large number of fine grooves of a desired pattern is herein disclosed, which comprises a body of substrate and a film of at least one polymerized-condensed or cross-linked organometal compound formed on the substrate and having a large number of fine grooves on the surface and which can be produced by applying a solution containing at least one organometal compound and optionally a thickening agent to the surface of a body of substrate to form a film thereon; then impressing the film with a mold having a large number of fine ridges thereon to form grooves corresponding to the ridges, on the film; or applying the solution to the mold to form such a film and transferring the film to the body of substrate; and then calcining the resulting film having fine grooves to solidify the same. According to the method, an excellent substrate having good durability and optical properties can be produced simply and in a good yield.

31 Claims, 2 Drawing Sheets

SUBSTRATE WITH FINE GROOVES AND METHOD FOR MANUFACTURING THE SAME

BACKGROUND OF THE INVENTION

1. Field of the Invention

The present invention relates to substrates with fine grooves, more specifically the invention pertains to substrates having a large number of fine grooves, which are suitable for making an optical disk, a diffraction grating or the like, and a method of manufacturing such substrates.

2. Description of the Prior Art

Heretofore, it has been known that a substrate having a large number of fine grooves on its surface is used to make an optical disk, a diffraction grating or the like and variety of methods for manufacturing such substrate have already been proposed. For example, it is known that a substrate for use in making an optical disk or the like can be produced by applying a photoresist film on a substrate such as a glass plate, selectively exposing the photoresist film to light such as laser beam utilizing a laser exposure machine followed by developing the film and then processing the surface of the substrate according to an etching technique such as a dry etching method through the film serving as a mask.

On the other hand, fine patterns used for producing a diffraction grating can be produced according to a method such as that disclosed in Japanese Patent Unexamined Publication No. 60-21215 in which such pattern is manufactured by gelling a solution containing an organometal compound while bringing the solution into contact with a mold of a desired shape, releasing the gel from the mold and then drying it to cause shrinkage until a desired form is achieved.

The first photoresist technique makes it possible to precisely forming grooves, which are spaced several microns apart from one another, on a substrate such as a glass plate, while when selectively exposing a photoresist layer to laser beam, it takes a long period of time for exposure, for example, it takes several tens of minutes to expose only one disk-like substrate, which leads to the extreme reduction in productivity. Moreover, the exposure machine of high precision utilizing a laser is very expensive and requires tedious operations to assure the precision.

In addition, the method in which a solution of organometal compounds permits the formation of patterns more finer than those of the mold used due to the shrinkage of the gel. However, there exists different problems such that the resultant gel tends to cause cracks during shrinkage and in worst case the gel is broken and that the gel suffers deformation such as warpage because of nonuniform drying rate.

For the purpose of eliminating the problems accompanied by the foregoing methods, Japanese patent application Ser. No. 60-241193 discloses a method for producing substrates with fine grooves, which comprises the steps of forming a plastic film on a substrate by applying a solution containing an organometal compound, impressing the surface with a mold having ridges of a desired pattern to form grooves corresponding to the ridges of the mold onto the surface of the film and then calcining the coated film to solidify it.

According to this method for producing substrate with grooves employing mold impressing technique, substrates for use in making an optical disk, a diffraction grating or the like may easily be obtained by quite simple procedures Moreover, the method provides advantages that the resulting film has a shrinkage lower than that of the gel film and seldom causes cracks and/or warpage since the organometal compound if formed in a film on the substrate body.

However, the substrate body such as a glass plate in general has undulation ranging from about $10^2$ to $10^3$ nm which are spaced 100 to 1000 $\mu$m apart from one another. Therefore, if it is intended to uniformly form a great deal of very fine patterns of 70 nm in depth and about 1 $\mu$m in width on such a substrate, the mold should be pressed to the substrate under an extremely high pressure, otherwise the mold would not be brought into contact with the whole surface of the substrate intimately, in particular the coated film due to the presence of undulation or unevenness on the surface of the mold and substrate. In addition, there is a strong tendency to cause deformation in shape and/or formation of defectives because of troublesome procedures during impressing the coated film with the mold.

It is believed that the foregoing drawbacks associated with the conventional method can be eliminated by (i) previously treating the surface of the substrate and die for pressing so that the degree of evenness thereof falls within the range of not more than $\pm 10$ nm, according to, for instance, an abrasion technique, or (ii) impressing the substrate with the die for pressing under a pressure which may cause deformation of the substrate. However, the method (i) leads to an extreme increase in the processing cost, while the method (ii) also results in the substantial wear and deformation of the die used, which in turn leads to the increase in cost for die. Therefore, in this method, the surface of the substrate and die for pressing should likewise be made uniform.

SUMMARY OF THE INVENTION

As seen from the aforementioned discussion, conventional substrates with fine grooves for use in making an optical disk, a diffraction grating or the like and methods for producing them suffer a variety of disadvantages to be eliminated. Accordingly, there has been strong need for substrates and/or methods of production thereof which have no such disadvantages and on the contrary provide substrates having an extremely high reliability in a high productivity.

Thus, it is a principal object of the present invention to provide a new substrate having a large number of extremely fine grooves on the surface thereof in a desired pattern.

It is another object of the present invention to provide a method for producing the aforementioned substrates practically applicable in making optical disks, diffraction gratings or the like.

It is a further object of the present invention to provide a method for manufacturing the substrates having a large number of extremely fine grooves thereon, which is quite simple and economical and makes it possible to form such substrate in a good yield.

The inventors of this invention have conducted studies for overcoming the drawbacks accompanied by the conventional methods for producing substrate with a large number of very fine grooves thereon and used for making optical disks, diffraction gratings and found that these drawbacks can effectively be eliminated by transferring a specific film of an isolated viscosity having grooves previously coated on a mold of the corresponding patern of grooves or by impressing a specific film of an increased viscosity applied on a substrate with a mold having a desired pattern of grooves or further employing a mold of a specific organic polymeric material and thus completed the present invention.

Thus, the above mentioned and other objects of this invention can be achieved by providing a substrate with a large number of fine grooves which comprises a body of the substrate and a film of at least one polymerized-condensed or crosslinked organometal compound having a large number of grooves with a desired pattern on the surface thereof. The substrate with grooves of the present invention may be produced according to a method which comprises the steps of applying a solution containing at least one organometal compound and a thickening agent to the surface of a mold having fine grooves and ridges to form a specific film of the organometal compound, impressing a surface of a body of substrate with the specific film together with the mold to transfer the specific film to the surface of the body of substrate and then calcining the specific film or a method comprising applying a solution containing at least one organometal compound and a thickening agent to the surface of a body of substrate to form a specific film thereof, impressing the surface of the specific film with a mold having a large number of fine ridges of a desired pattern and then solidifying the specific film by calcining the same.

Consequently, the present invention makes it possible to provide an excellent substrate having a large number of fine grooves thereon and free from cracks and warpage in a good yield or productivity according to a simple and easy procedures.

BRIEF DESCRIPTION OF THE ATTACHED DRAWINGS

Figure 2A:
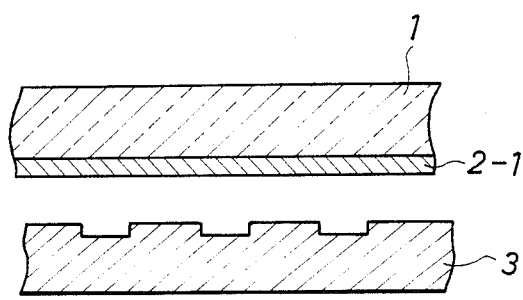
Figure 2B:
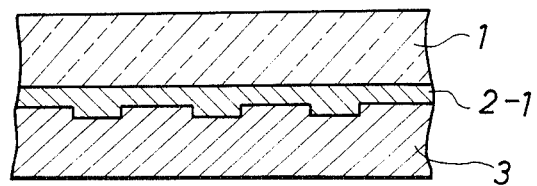
Figure 3A:
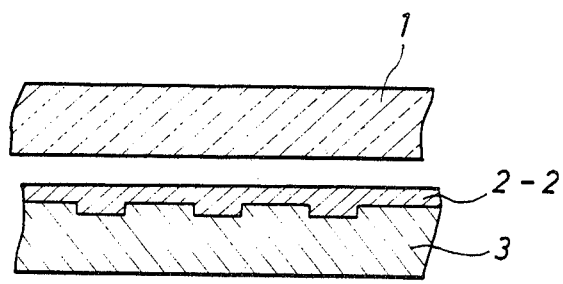
Figure 3B:
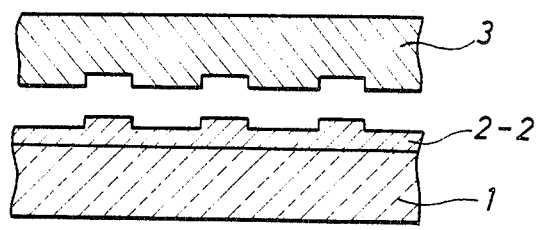

The present invention will hereunder be explained more in detail with reference to the accompanying drawings in which:

FIG. 1 shows a schematic diagram illustrating an embodiment of substrate with fine grooves according to the present invention:

FIGS. 2a and 2b are schematic diagrams for explaining a process for manufacturing the substrate shown in FIG. 1; and FIGS. 3a and 3b are the same diagrams as in FIGS. 2a and 2b respectively, for explaining another method for manufacturing the substrate shown in FIG. 1.

DETAILED EXPLANATION OF THE INVENTION

As will be seen from the attached FIG. 1, the substrate S having a large number of extremely fine grooves according to the present invention comprises a body 1 of the substrate and a film 2 of organometal compounds having grooves 3 thereon formed in a desired pattern, which is closely adhered to one surface of the body 1.

First of all, the body of the substrate of the present invention may be any materials such as those used in the conventional substrates having fine grooves thereon and preferably includes, for instance, amorphous materials such as glasses because of their low reactivity with a solution for forming a film thereon, as will hereunder be explained in more detail, and high stability to heat treatments or high heat resistance.

In addition, the organometal compound which can be used in the present invention may be any compounds which cause polymerization-condensation reaction or crosslinking reaction to increase the viscosity of a solution containing at least one of them. Examples of such organometal compounds are metal alcoholates represented by the following general formula:

M(OR)n wherein M stands for a metallic element such as Si, Ti, Zr, Ca, Al, Na, Pb, B, Sn and Ge, R represents a lower alkyl group such as methyl, ethyl, propyl, butyl and n is an integer of 1 to 4, inclusive of $Si(OCH_3)_4$, $Si(OC_2H_5)_4$, $Ti(OC_3H_7)_4$, $Ti(OC_4H_9)_4$, $Zr(OC_3H_7)_4$, $Zr(OC_4H_9)_4$, $Al(OC_3H_7)_3$, $Al(OC_4H_9)_3$, $NaOC_2H_5$, which are in general used in the so-called sol-gel method; and those containing functional groups capable of causing polymerization-condensation or crosslinking reaction, such as —Cl, —COOH, —COOR (wherein R has the same meaning as defined above), —$NH_2$,

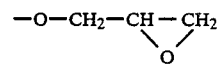

or —O—CO—C($CH_3$)=$CH_2$. Among these compounds, metal alcoholates are particularly preferred examples as organometal compound used herein.

The thickness of the film of at least one organometal compound which is polymerized-condensed or crosslinked therein is not critical and may vary within a wide range as a function of applications.

The depth and width of the grooves and the distance between the neighboring two of them may also vary depending on the specific applications and are clearly recognized by those skilled in the art.

The substrates with fine grooves of the present invention having the aforementioned structure can easily be produced according to any one of the following methods. One of which is schematically illustrated in FIGS. 2a and 2b. According to this method, a film 2-1 of an organometal compound is first formed on the surface of a body 1 of substrate by applying or coating a solution containing at least one of organometal compound as already listed above (see FIG. 2a).

The solution further includes a thickening agent, the addition of which makes it possible to increase viscosity of the solution containing the organometal compound and simplify the formation of the film on the body 1. Typical examples of such thickening agents include water-soluble and organic solvent-soluble polymeric materials. However, polyethylene glycol polyether glycol are particularly preferred since the use thereof makes it possible to maintain a proper viscosity of the resulting film of the solution, in other words a soft condition thereof for a substantially long period of time.

The molecular weight of such polyethylene glycol and polyether glycol preferably used in the process of this invention desirably falls withiln the range of from 300 to 800 and these polyethylene glycols and polyether glycol provide a uniform dispersion. For the purpose of attaining a good thickening effect and preventing the deterioration of the resultant film, polyethylene glycol and polyether glycol as the thickening agent should preferably be added to the coating solution in an amount of about 0.5 to 1.8 times of the weight of the oxides subsequently formed from the solution.

The organometal compound and the thickening agent are dissolved in a mixed solvent of water and at least one organic solvent such as methyl alcohol, ethyl alcohol, formamide and isopropyl alcohol to form the solution (or coating solution to obtain the film.) The mixed solvent may optionally includes at least one catalyst for hydrolysis such as an acid (e.g., nitric acid), and an alkali.

The solution can be applied to the surface of the body according to a known technique such as dipping method in which the body is immersed in the solution and then drawn up therefrom, spin coating method comprising dropping a desired amount of the solution on the surface of the body and then rotating the same to uniformly cover the surface and spraying method. The solution is preferably coated or applied in a thickness of from 0.1 to 10 μm. This is because, if the thickness is less than 0.1 μm a uniform film and grooves thereon as mentioned below cannot be obtained while if the thickness is more than 10 μm, the resultant film has a tendency to cause cracks and/or release.

The film thus formed on the substrate is then impressed with a mold 3 having, thereon, a large number of fine ridges of a desired pattern, as shown in FIG. 2b, to form fine grooves on the surface of the film, corresponding to the form of the ridges on the mold. The height of the ridges on the mold may vary depending on the depth of the grooves required to a final substrate to be produced. For example, when the substrate is used for making an optical disk utilizing a laser beam of 830 nm in wavelength, the grooves 50 to 200 nm in general about 70 nm in depth are usually required. Therefore, the preferred height of the ridges is in the range of from 0.1 to 0.3 μm in which the reduction thereof by shrinkage during the subsequent processes is taken into consideration when producing substrates for optical disks. Moreover, when it is intended to form diffraction gratings from the substrate, the depth of the groove is in general about 400 nm. Therefore, preferred height of the ridges on the mold falls within the range of 0.8 to 1.5 μm.

The pitch between the neighboring two ridges also varies depending on the width of the groove to be formed on the final substrate with grooves. In this respect, the shrinkage of the film in the horizontal direction can almost be neglected since the thickness thereof is quite low. Thus, the pitch of the mold may preferably be equal to those ultimately required, for instance, about 1.6 to 2.0 μm in the case of optical disks and 1 to 100 μm in the case of diffraction gratings.

The materials of the mold or die for pressing may be a metal or a plastic such as polyethylene, polypropylene, fluorine plastics. A metal mold is in general preferred because of its good durability. However, if only a small number of pressing operation is required, plastic mold may be used, provided that it has not a reactivity with the coated film and is less expensive compared with those of a metal.

The coated film is impressed with the foregoing mold while the film still maintains its plasticity. At this stage, the coated film desirably should be a viscosity of in the range of 10 to $10^5$ poises. This is because, if the viscosity thereof is less than 10 poises, there is observed a flow of the coated film when the film is pressed with the mold and then removed therefrom and this results in the deformation or breakage of the grooves formed, while if the viscosity of the coated film is more than the upper limit ($10^5$ poises), the intended grooves are not formed thereon even if it is impressed with the mold or the film is sometimes peeled off from the substrate.

In the case where the viscosity of the coated film is less than 10 poises, the same effect as mentioned above may also be expected if the coated film is impressed with the mold while processing the solidifying reaction of the organometal compound included therein by, for instance, hydrolysing it until the viscosity of the film reaches at least 10 poises, and then removing the mold from the partially solidified film.

Then, the coated film on which a large nubmer of fine grooves are formed is calcined to solidify the same. This procedure is preferably carried out by heating it to at least 200° C. and thus, the organic materials still remaining in the film are surely evaporated or decomposed. Moreover, the film is converted to a glass-like one having a high durability and excellent optical properties by the calcining process.

The excellent substrate with fine grooves of the present invention may also be produced according to a method shown in FIGS. 3a and 3b. In this method, the solution containing at least one organometal compound such as those listed above is first applied or coated on the surface of a mold 3 having a large number of fine ridges (see, FIG. 3a) to form a film 2-2 of the organometal compound. This solution (coating solution) comprises at least one of the organometal compound explained above with reference to the first method for producing the substrate, an organic solvent and water. Examples of such organic solvents include ethyl alcohol, methyl alcohol, isopropyl alcohol and formamide which may be used independently or in combination. The organic solvent may optionally include at least one catalyst for hydrolysis as mentioned in the first method.

The mold as used in this method has a large number of fine grooves which are preferably in a size easily filled with the coating solution to form a film and, for instance, the mold preferably has projected portions or ridges of 50 to 200nm in height, 0.4 to 2.0 μm in pitch and 0.4 to 2.0 μm in width when a substrate for use in making an optical disk is to be produced. That is, if the height of the ridges is less than 50 nm and the ptich and the width of the ridges are more than 2.0 μm respectively, the grooves formed on the film are too shallow and too sparse to use as the substrate with grooves for making an optical disk and which is not practically acceptable. While, if the height thereof is more than 200 nm and the pitch and the width thereof are less than 0.4 μm respectively, a coated film of uniform grooves cannot be obtained and therefore such product may not be put into practical use.

The coating solution may be coated or applied to the same methods as already described in connection with the first method for producing the substrate. In addition to these method, the brush coating method can be employed in this method. When the solution is applied to the mold by dipping method, it is noted that the mold is dipped in the solution while reducing the pressure applied thereto.

The film thus formed on the mold is then transferred onto the surface of a body 1 of substrate which may be made from the same materials as before (see FIG. 3b). This procedure can be carried out by simply impressing the film together with the mold with the surface of the substrate body.

In this method, a uniform film (undercoating film) may be applied on the surface of the substrate prior to the transfer of the film having a large number of grooves on the surface thereof to improve the uniformity of the surface and/or the adhesion between the film of grooves and the substrate. Such film may be obtained from the aforementioned coating solution or other equivalent solutions. In this case, a rather thick film may be formed on the substrate even if a coating solution having a low viscosity is used, which in general results in a thin film with fine grooves. This is rather preferred, since the amount of air or the like possibly remaining between the film and the bottom of the grooves of the mold is quite small when a coating solution of low viscosity is used to form the film.

As discussed above, although the coating solution of low viscosity is easy to handle and apply to the mold surface with fine grooves, it is preferred to add a thickening agent to the coating solution for the purpose of preventing the deformation of the film having fine grooves and assuring a sufficient thickness thereof corresponding to the depth of the grooves. Among others, polyethylene glycol or polyether glycol is particularly preferred as the thickening agent.

In the foregoing two methods, the mold for forming fine grooves on the surface of the film composed of organometal compounds may be a thin organic polymeric plate. The organic polymeric plate may be produced from those having a coefficient of elasticity of $10^3$ to $10^7$ Kgf/cm$^2$ which permits the restriction in deformation of the mold during impressing and making compensation for the presence of warpage on the surface of the substrate.

The thickness of the organic polymeric mold ranges from 1 to 1000 μm and preferably from 10 to 200 μm. The limitation of the mold thickness allows the mold to cause the deformation of the mold per se while causing warpage (corresponding to that of the substrate) due to the surface tension of the coating still remaining plasticity and existing between the mold and the substrate during formation of grooves or transferring the film to the surface of the substrate and the film or mold can easily be adhered closely to the substrate.

Examples of such organic polymeric materials effectively used herein include silicone resins, fluorine resins, cellulose acetate, polymethacrylate, polyacrylate, polycarbonate, polyvinyl chloride, polyethylene, polyethylene terephthalate, polymethyl methacrylate, polystyrene, polyvinyl acetate, polyacrylonitrile and polyvinyl ketone.

The organic polymeric materials used in the method should be inert and stable to coating solutions containing organometal compounds, organic solvents, water, acids, alkalis and thickening agents since these solutions or films obtained therefrom are directly applied to or brought into contact with these materials. However, those soluble in organic solvents, acids or alkalis other than those included in the coating solutions can preferably be used, since the polymeric mold may be removed chemically instead of mechanical removal thereof. Moreover, those easily removed by heating and burning it to, in particular, not more than 300° C. in an oxidizing atmosphere are also preferred, since the release of the film can surely be prevented during the removal of the mold.

In the foregoing methods according to the present invention, the solidification of the film formed on the substrate is preferably carried out in two stages, the first stage of which comprises heating the film at a temperature of 50° to 200° C. for 1 to 60 minutes and the second stage of which comprises heating it at a temperature of more than 200° C. This is because, if the film is rapidly heated to a high temperature, a good substrate having fine grooves cannot be obtained since such heat treatment possibly causes foaming, deformation of shape thereof, partial release thereof or the like due to the evaporation of water, organic materials included therein. On the other hand, it takes a long period of time to complete the heat treatment if the film is quite slowly heated for the purposes of preventing these detrimental phenomena from causing, this results in the substantial reduction in yield or productivity.

As described above, the first heating stage, which is in general carried out to slowly evaporate organic solvents, water or the like and to soldifiy the film, is carried out at a temperature of 50° to 200° C. for 1 to 60 minutes. This is because, if the temperature is less than 50° C., the aforementioned detrimental effects can surely be prevented, however it requires a quite long time to finish the intended heat treatment and is not desirable in view of the productivity, while if the film is heated to more than 200° C. at this stage, the detrimental effect cannot be eliminated. Moreover, if the treatment time is less than one minute, the desired effects cannot be achieved while in view of the yield the time for this heat treatment is preferably not more than 60 minutes. The preferred temperature therefor falls within the range of 70° to 180° C. The temperature is not always constant and may vary in the range of 50° to 200° C. during the treatment. In general, the higher the temperatue, the shorter the treatment time.

Likewise, the second stage is carried out at a temperature of at least 200° C. as already described above. If the temperature is less than 200° C., the film includes residual organic solvents, water or the like and accordingly the weatherability thereof is lowered. Moreover, within a temperature range of the heat resistance of the substrate, the temperature is preferably as high as possible, however, from viewpoint of economy or productivity, it should be at most 500° C. The preferred range thereof is 350° to 500° C.

The removal of the mold which is to be pressed against the substrate can be effected, for instance, by a mechanical operation at the time when the film is solidified in some degree followed by cooling it to a rather low temperature i.e., after the first heat treatment; by burning off during the second heat treatment, by dissolving it with chemicals or by a mechanical operation after calcination of the film at a high temperature. Among these, preferred are operations for mechanically and/or chemically removing the mold after the first heat treatment for the purposes of preventing the deformation or breakage of the film in particular the grooves formed thereon and the deterioration of the film by the mold (eg. the deterioration of the film due to the reaction of the film with ashes of the mold materials, the deformation thereof because of the presence of the mold).

Thus, according to the present invention, an excellent substrate with a large number of fine grooves having a good durability and optical properties and the substrate can effectively be used for providing optical disks, diffraction grating or the like of an excellent performance.

Moreover, the substrate can easily and industrially be produced according to the methods of this invention in good productivity or high yield.

First of all, in the first method of producing such a substrate according to the present invention, a thickening agent is added to the coating solution, which allows the film obtained from the solution to maintain, over a long period of time, a desired viscosity suitable for carrying out the grooves-formation operation (i.e., pressing operation). Therefore, the workability is substantially improved and the stable production of the substrate can be expected. Moreover, the thickness of the film formed by a single coating operation is thicker than that formed from the conventional coating solution, since the viscosity thereof may be controlled, which leads to the simplification of the coatilng operation compared with the conventional techniques.

In addition, according to the second method of this invention, the shape of the mold (ridges) can precisely be transferred to the film since the coating solution is directly applied to the surface of the mold with ridges. Moreover, the formation of cracks and warpage can substantially be reduced and a high productivity can be expected. In addition, if an underlying film is formed on the surface of the substrate to which the film having fine grooves is transferred, the influence of the unevenness of the surface (substrate) on the transfer of the film thereto can be neglected.

Furthermore, when a mold of a polymeric material is used, the adherence between the film and the substrate is largely improved and a substrate having uniform fine grooves can effectively be produced without any abrasion treatment of the surface of the substrate, because of the flexibility of the mold which substantially compensates for the presence of warpage on the substrate. This method permits the formation of macroscopically curved substrate with fine pattern economically. In this method, the mold may be removed by burning off or chemically dissolving it and, therefore, problems associated with the release of mold are not taken into consideration.

Finally, in these method if the calcination process is effected stepwise in two stages, a variety of problems accompanied by a quick heating, such as foaming, deformation of the film, partial release thereof or the like because of the presence of water, organic materials or the like can completely be elimiated.

The present invention will hereunder be explained in more detail with reference to practical examples for manufacturing substrates with a large number of fine grooves on the surface thereof according to the present invention and the effects practically achieved will also be discussed.

EXAMPLE 1

Each of Si-tetraethoxide and B-triisopropoxide was weighed so that the molar ratio between them was 80:20 on the basis of the molar amount when they were converted to $SiO_2$ and $B_2O_3$ respectively. To the weighed amount of Si-tetraethoxide, there were added ethanol in an amount of 5 times moles of the former and water (including 6wt% of $HNO_3$) in an amount of 6 times moles thereof and the resultant mixture was refluxed at about 70° C. for 4 hours. Then the weighed amount of B-triisopropoxide was added dropwise and further refluxed for additional 4 hours. The resulting solution was diluted with equivalent amount (volume) of ethanol and polyethylene glycol having a molecular weight of 600 (PEG600) was then added thereto and uniformly dissolved therein in a molar ratio PEG600/(mixed oxide) of 0.15 (wherein "mixed oxide" means the combined amount of $SiO_2$ and $B_2O_3$ as the final product) to obtain a coating solution.

A glass substrate previously washed and dried was immersed in the coating solution prepared above and drawn up slowly to form a coated film (thickness: about 0.2 μm) of the solution of the surface of the substrate.

The viscosity of the film did not change even after leaving to stand for a long period of time in air and the film had a creamy appearance and a viscosity of $10^2$ to $10^3$ poises.

Thereafter, a metallic mold having a large number of fine ridges (0.15 μm in height, 2 μm in width and 4 μm in pitch respectively) was pressed against the film formed on the surface of the glass substrate, the condition was held for 5 minutes and then the mold was slowly removed from the film to obtain a large number of fine grooves corresponding to the form of the ridges. Then, the glass substrate provided with the film having fine grooves was gradually heated up to 450° C. and the temperature was maintained for 2 hours to calcine or solidify the film. According to the calcination operation, ethanol and water were evaporated from the film and a glass-like amorphous film having a thickness of about 0.12 μm was obtained The surface of the substrate with grooves thus obtained was examined with a light microscope and it was observed that an excellent grooves of about 72 nm in depth, about 2 μm in width and about 4 μm in distance between the neighboring two grooves were formed as seen from FIG. 1.

EXAMPLE 2

The procedures similar to those set forth in Example 1 were repeated except that polytetramethylene etherglycol having a molecular weight of 650 (Terathane ®; manufactured and sold by Du Pont de Nemours & Co.) was used instead of PEG 600 and a similar excellent result was obtained.

EXAMPLE 3

To one mole of Si-tetraethoxide, there were added 15 moles of ethanol and 6 moles of water and PEG600 was further added to and uniformly dissolved in the resulting solution in a molar ratio PEG600/(molar amount of $SiO_2$ as the final product) of 0.15 to form a coating solution.

Employing the coating solution thus prepared, a film was formed on a glass substrate, then a metallic mold was pressed against the film to form a large number of fine grooves thereon and the film was calcined at 450° C. for 2 hours according to the procedures similar to those in Example 1.

The surface of the substrate with fine grooves obtained according to the above described procedures was observed utilizing a light microscope and it was found that excellent grooves as shown in FIG. 1 were formed on the surface thereof as in Example 1.

EXAMPLE 4

Each of Si-tetraethoxide and triethyl phosphate was weighed so that the molar ratio between them was 80:20 on the basis of the molar amount of $SiO_2$ and $P_2O_5$ which were final products of the foregoing two ingredients. To the weighed amount of Si-tetraethoxide there were added ethanol in an amount of 5 times moles of the former and water (containing 6% by weight of $HNO_3$) in an amount of 6 times moles thereof and the resultant mixture was refluxed at about 70° C. for 4 hours. Then, the weighed amount of triethyl phosphate was added thereto dropwise and the reflux was continued for additional 4 hours. Two volumes of ethanol were added to the refluxed solution and uniformly mixed to form a coating solution.

To the coating solution prepared above, there were immersed a mold by metallic Si having a large number of ridges (0.15 μm is height, 1.0 μm in width and 2.0 μm in pitch) and a glass substrate which were previously subjected to surface abrasion, washing and drying and thereafter they were slowly drawn up from the coating solution to form films on the surfaces of them.

Then, the film formed on the mold was pressed against the film formed on the glass substrate to transfer the former to the substrate by maintaining them in such condition for about one hour and gradually removing the mold. The glass substrate having the film with fine grooves was slowly heated up to 500° C. and the temperature was maintained for 10 minutes to calcine or solidify the film. During the calcination procedure, ethalnol and water contained in the film were removed by evaporation and a glass-like amorphous film of about 0.1 μm thickness was obtained.

It was found that the surface of the substarate thus produced had excellent grooves of about 70 nm in depth, about 1 μm in width and about 2 μm in distance between the neighboring two grooves when it was observed with an electron microscope.

EXAMPLE 5

Each of Si-tetraethoxide and B-triisopropoxide was weighed so that the molar ratio therebetween was 80:20 on the basis of the molar amount of $SiO_2$ and $B_2O_3$ which were final products of the foregoing two starting compounds. To the weighed amount of Si-tetraethoxide, there were added ethanol in an amount of 5 times moles of the former and water (containing 6% by weight of $HNO_3$) in an aount of 6 times moles thereof and the resultant mixture was refluxed at about 70° C. for 4 hours. Then, the weighed amount of B-triisopropoxide was added dropwise to the refluxed mixture and the reflux was carried out for additional 4 hours. The resulting solution was diluted with two volumes of ethanol and PEG600 was added to and uniformly dissolved in the solution so that the weight ratio PEG600/-$(SiO_2+B_2O_3)$ is equal to 0.5 to form a coating solution.

Thereafter, the procedures as set forth in Example 4 were repeated except that a glass substrate was not immersed in the solution and an amorphous film having a thickness of about 0.1 μm was formed on the glass substrate.

It was found that excellent grooves of about 70 nm in depth, D1.0 1 μm in width and about 2.0 μm in distance between the neighboring two grooves were formed on the surface of the film when observing the surface using an electron microscope.

EXAMPLE 6

Each of Si-tetraethoxide and triethyl phosphate was weighed so that the molar ratio therebetween was 80:20 on the basis of the molar amount of $SiO_2$ and $P_2O_5$ which were final products of these two compounds after calcination respectively. To the weighed amount of Si-tetraethoxide, there were added ethanol in an amount of 5 times moles of the former and water (containing 6% by weight of $HNO_3$) in an amount of 6 times moles thereof and the resultant mixture was refluxed at about 70° C. for 4 hours. Then, the weighed amount of triethyl phosphate was added dropwise to the reluxed solution and the reflux was carried out for further 4 hours. Two volumes of ethanol were added to dilute the solution and thoroughly admixed to form a coating solution.

In the coating solution prepared above, there was immersed a mold of cellulose acetate (coefficient of elasticity = $10^6 Kgf/cm^2$) having a thickness of 10 μm and a large number of fine ridges (0.15 μm in height, 2 μm in width and 4 μm in pitch) and then the mold was gradually withdrawn from the solution to form a film thereon.

Thereafter, a glass substrate previously washed and dried was superimposed on the mold through the film to closely adhere them together. At this stage, the substrate and the film could be closely brought into contact with each other due to the surface tension of the film still maintaining its plasticity and present between the mold and the glass substrate, and the use of the mold which is thin and flexible.

The resulting integrated article was heated as it was and the calcination was effected at 500° C. for 10 minutes. During the calcination operation, the mold was completely burned off, ethanol and water included in the film were removed by evaporation and thus a glass-like amorphous film of about 0.1 μm in thickness was formed on the glass substrate.

The surface of the film was examined by an electron microscrope and it was found that excellent grooves of about 75 nm in depth, about 2 μm in width and about 4 μm in distance between the adjacent two grooves were formed on the film.

EXAMPLE 7

Each of Si-tetraethoxide and B-triisopropoxide was weighed so that the molar ratio therebetween was 80:20 on the basis of the molar amount of $SiO_2$ and $B_2O_3$ which were final products of these compound respectively. To the weighed quantity of Si-tetraethoxide there were added ethanol in an amount of 5 times moles of the former and water (containing 6% by weight of $HNO_3$) in an amount of 6 times moles thereof and the resulting mixture was refluxed at about 70° C. for 4 hours. Then, the weighed quantity of B-triisopropoxide was added dropwise to the refluxed solution and the resultant solution was further refluxed for additional 4 hours. The solution was diluted with the addition of two volumes of ethanol and PEG600 was then added to and uniformly dissolved in the diluted solution in a weight ration $PEG600/(SiO_2+B_2O_3)$ of 0.5 to form a coating solution.

Then, the procedures similar to those as set forth in Example 6 were repeated to form a glass-like amorphous film of 0.1 μm in thickness on a glass substrate.

It was found that excellent fine grooves of about 70 nm in depth, about 2 μm in width and 4 μm in distance between the neighboring two grooves were formed on the surface of the resultant film when it was examined with an electron microscope.

EXAMPLE 8

The precedures in Example 7 were repeated except that a glass substrate was dipped in the coating solution instead of dipping the mold of cellulose acetate therein and thus an amorphous film of about 0.1 μm in thickness was formed on the surface of the glass substrate. The surface of the film was identical to that in Example 7.

EXAMPLE 9

Si-Tetraethoxide and B-triisopropoxide were weighed respectively so that the molar ratio therebetween was 80:20 on the basis of the molar amount of $SiO_2$ and $B_2O_3$ which were the final products of these compounds after calcination. To the weighed amount of Si-tetraethoxide there were added ethanol in an amount 5 times moles of the Si-tetraethoxide and water (containing 6% by weight of $HNO_3$) in an amount 6 times moles thereof and the resulting mixture was refluxed at a temperature of about 70° C. for 4 hours and further the weighed amount of B-triisopropoxide was added dropwise to the refluxed solution followed by refluxing the solution for additional 4 hours. Then, the solution was diluted with equivalent volume of ethanol to form a coating solution.

In the coating solution thus prepared, there was dipped a mold of cellulose acetate having a large number of fine ridges (0.15 μm in height, 2 μm in width and 4 μm in distance between the neighboring two ridges) and the mold was then slowly withdrawn from the coating solution to form a film on the mold of cellulose acetate.

Thereafter, the mold on which the film was applied was superimposed on a glass substrate previously washed and dried through the film and then the integrated article was dried as it was for 30 minutes.

The dried article per se was heat treated at 150° C. for 10 minutes. This preheat treatment made it possible to evaporate ethanol and water contained in the film and to solidify the film.

The integrated article was further heat treated at 500° C. for 10 minutes to remove (burn off) the mold of cellulose acetate and to obtain a glass-like amorphous film of about 0.2 μm in thickness.

The surface of the resultant substrate having the film with fine grooves was examined with a light microscope and it was observed that excellent fine grooves of about 0.7 m in depth, about 2 μm in width and 4 μm in distance therebetween were formed on the film.

EXAMPLE 10

A mold similar to that used in Example 9 was immersed in the coating solution prepared in Example 10, slowly withdrawn therefrom to form a film on the mold, superimposed to a glass substrate through the film and the resulting integrated article per se was dried at room temperature for 30 minutes. The integrated article was then subjected to heat treatment in a drying oven maintained at 150° C. for 10 minutes.

After the first heat treatment, the mold was mechanically released from the film and the resultant glass substrate provided with the film thereon was treated by heating it to 500° C. for 10 minutes to form a glass-like amorphous film having a thickness of about 0.2 μm.

The surface of the substrate having the film was examined with a light microscope. As a result, excellent fine grooves having about 0.7 μm in depth, about 2 μm in width and 4 μm in distance therebetween were observed on the surface of the film.

EXAMPLE 11

According to the same procedures as in Example 9 and Example 10, two integrated articles subject to preheat treatment were obtained.

The resulting integrated articles per se were then dipped in methyl acetate heated to 50° C., maintained therein for about one hour and withdrawn from methyl acetate. During dipping, the mold of cellulose acetate was completely dissolved in methyl acetate.

Then, the glass substrates with the films were treated by heating them to 500° C. for 10 minutes and as a result, glass-like, amorphous films having a thickenss of about 0.2 μm were formed on each glass substrate.

Likewise, it was found that these substrate had excellent grooves of about 0.7 μm in depth, about 2 μm in width and 4 μm in distance therebetween on the surface of the film as in Example 9 and 10.

We claim:

1. A substrate having a large number of fine grooves on the surface therof comprises a body of substrate and a calcined film of at least a thickening agent and one polymerized, condensed or cross linked organometal compound, having a large number of fine grooves thereon and adhered to the surface of the body.

2. The substrate as set forth in claim 1 wherein the organometal compound is at least one member selected from the group consisting of metal alcoholates represented by the following general formula:

$M(OR)_n$ wherein M represents a metal element selected from the group consisting of Si, Ti, Zr, Ca, Al, Na, Pb, B, Sn and Ge; OR represents a lower alkyl group and n is an integer of 1 to 4, and organometal compounds having at least one functional group capable of causing polymerization, condensation or crosslinking reaction.

3. A substrate having a large number of fine grooves on the surface thereof comprising a body of substrate and a calcined film of at least one polymerized, condensed or crosslinked organometal compound, having a large number of fine grooves thereon, the organometal compound being adhered to the surface of the body and is at least one member selected from the group consisting of metal alcoholates represented by the following general formula:

$M(OR)_n$ wherein M represents a metal element selected from the group consisting of Si, Ti, Zr, Ca, Al, Na, Pb, B, Sn and Ge; and OR represents a lower alkyl group; and n is an integer of 1 to 4, said organometal compound having at least one functional group capable of causing polymerization, condensation or crosslinking reaction.

4. A method for manufacturing substrates having a large number of fine grooves thereon comprises the steps of:

applying a solution containing at least one organometal compound and a thickening agent onto a body of substrate to form a film having plasticity, impressing the surface of the film formed on the substrate with a mold provided with a large number of fine ridges thereon to form a large number of fine grooves corresponding to the ridges on the surface of the film, and calcining the film to solidifiy the same.

5. The method according to claim 4 in which the thickening agent is a polymeric material which is soluble in water and organic solvent.

6. The method according to claim 5 in which the thickening agent is polyethylene glycol or polyether glycol and the amount thereof used falls within the range of from 0.5 to 1.8 times of the weight of oxides formed from the organometal compound.

7. The method according to claim 4 in which the organometal compound is at least one metal alcoholate.

8. The method as set forth in claim 4 wherein the film is impressed with the mold when the viscosity of the film is in the range of 10 to $10^5$ poises.

9. The method a set forth in claim 4 wherein the film is calcined at a temperature of at least 200° C.

10. The method as set forth in claim 4 in which the mold is a thin organic polymeric plate having a coefficient of elasticity of $10^3$ to $10^7 Kgf/cm^2$.

11. The method as set forth in claim 10 in which the thickness of the mold is in the range of 1 to 1000 μm.

12. The method as set forth in claim 11 in which the organic polymeric material is at least one member selected from the group consisting of silicone resins, cellulose acetate, fluorine resins, polymethacrylate, polyacrylate, polycarbonate, polyvinyl chloride, polyethylene, polyethylene terephthalate, polymethyl methacrylate, polystyrene, polyvinyl acetate, polyacrylonitrile, polyvinyl ketone.

13. The method as set forth in claim 10 wherein the mold is removed from the film after impressing by heating and burning the mold at a temperature not more than 300° C.

14. The method as set forth in claim 10 wherein the mold is removed from the film by dissolving it with an organic solvent.

15. The method as set forth in claim 10 in which the calcination is carried out in two stages.

16. The method as set forth in claim 15 wherein the calcination is first carried out at a temperature of 50° to 200° C. for 1 to 60 minutes and then at a temperature of at least 200° C.

17. The method as set forth in claim 16 in which the calcination is first carried out at a temperature of 70° to 180° C. and then at a temperature of 350° to 500° C.

18. The method as set forth in claim 17 wherein the mold is a thin organic polymeric plate having a coefficient of elasticity of $10^3$ to $10^7 Kgf/cm^2$.

19. A method for manufacturing a substrate having a large number of fine groves thereon comprising the steps of:
applying a solution containing a thickening agent and at least one organometal compound onto a mold having thereon, a large number of fine ridges to form a film,
transferring the film to the surface of a body of the substrate by impressing the film together with the mold with the body of the substrate, and
calcining the transferred film to solidify the same.

20. The method as set forth in claim 19 wherein an underlying film of a solution containing at least one organometal compound is applied to the surface of the substrate body, to which the film is adhered, prior to transferring the film to the surface.

21. The method as set forth in claim 19 in which the height of the ridges is in the range of 50 to 200 nm.

22. The method as set forth in claim 19 in which the thickening agent is polyethylene glycol or polyether glycol.

23. The method as set forth in claim 19 wherein the mold is a thin organic polymeric plate having a coefficient of elasticity of $10^3$ to $10^7 Kgf/cm^2$.

24. The method as set forth in claim 23 wherein the thickness of the mold is in the range of 1 to 1000 μm.

25. The method as set forth in claim 19 wherein the organic polymeric material is at least one member selected from the group consisting of silicone resins, cellulose acetate, fluorine resins, polymethacrylate, polyacrylate, polycarbonate, polyvinyl chloride, polyehtylene, polyethylene terephthalate, polymethylmethacrylate, polystyrene, polyvinyl acetate, polyacrylonitrile, polyvinyl ketone.

26. The method as set forth in claim 23 wherein the mold is removed by burning it off at a temperature of not more than 300° C.

27. The method as set forth in claim 23 wherein the mold is removed by dissolving it with an organic solvent.

28. The method as set forth in claim 19 wherein the calcination is carried out in two stages.

29. The method as set forth in claim 28 wherein the calcination is first carried out at a temperature of 50° to 200° C. for 1 to 60 minutes and then at a temperature of at least 200° C.

30. The method as set forth in claim 29 wherein the calcination is first carried out at a temperature of 70 to 180 C. and then at a temperature of 350° to 500° C.

31. The method as set forth in claim 30 wherein the mold is a thin organic polymeric plate having a coefficient of elasticity of $10^3$ to $10^7 Kgf/cm^2$.

* * * * *

UNITED STATES PATENT AND TRADEMARK OFFICE
CERTIFICATE OF CORRECTION

PATENT NO.   : 4,810,547
DATED        : March 7, 1989
INVENTOR(S)  : Tsutomu Minami et al.

It is certified that error appears in the above-identified patent and that said Letters Patent is hereby corrected as shown below:

Column  2, line 68, "patern" should read --pattern--.
Column  6, line  9, "nubmer" should read --number--.
Column  6, line 40, "ptich" should read --pitch--.
Column  8, line 12, "soldifiy" should read --solidify--.
Column  9, line  8, "coatilng" should read --coating--.
Column  9, line 40, "elimiated" should read --eliminated--.
Column 11, line 18, "ethalnol" should read --ethanol--.
Column 11, line 21, "substarate" should read --substrate--.
Column 11, line 36, "aount" should read --amount--.
Column 11, line 51, "D1.01 µm" should read --1.0 µm--.
Column 14, line  8, "Example 9 and 10" should read --Examples 9 and 10--.

Signed and Sealed this

Fifth Day of December, 1989

Attest:

JEFFREY M. SAMUELS

*Attesting Officer*      Acting Commissioner of Patents and Trademarks